(12) United States Patent
Lewis

(10) Patent No.: US 9,944,190 B2
(45) Date of Patent: Apr. 17, 2018

(54) INTEROPERABLE EV WIRELESS CHARGING SYSTEM BASED ON AIR GAP BETWEEN PRIMARY AND SECONDARY COILS

(71) Applicants: Hyundai Motor Company, Seoul (KR); Kia Motors Corporation, Seoul (KR); Hyundai America Technical Center, Inc., Superior Township, MI (US)

(72) Inventor: Allan Lewis, Windsor (CA)

(73) Assignees: Hyundai Motor Company, Seoul (KR); Kia Motors Corporation, Seoul (KR); Hyundai America Technical Center, Inc., Superior Township, MI (US)

( * ) Notice: Subject to any disclaimer, the term of this patent is extended or adjusted under 35 U.S.C. 154(b) by 293 days.

(21) Appl. No.: 14/641,331

(22) Filed: Mar. 7, 2015

(65) Prior Publication Data

US 2016/0257209 A1    Sep. 8, 2016

(51) Int. Cl.
*B60L 11/18* (2006.01)
*H02J 7/00* (2006.01)
*H02J 50/10* (2016.01)

(52) U.S. Cl.
CPC ......... *B60L 11/182* (2013.01); *B60L 11/1846* (2013.01); *H02J 7/0027* (2013.01); *H02J 50/10* (2016.02); *B60L 2200/10* (2013.01); *B60L 2200/12* (2013.01); *B60L 2200/22* (2013.01); *B60L 2200/32* (2013.01); *B60L 2210/10* (2013.01); *B60L 2210/30* (2013.01); *B60L 2210/40* (2013.01); *B60L 2270/147* (2013.01); *Y02T 10/7005* (2013.01); (Continued)

(58) Field of Classification Search
CPC ..... B60L 11/182; B60L 11/1846; H02J 50/10; H02J 7/0027; H02J 7/025
USPC .................................................. 320/108, 109
See application file for complete search history.

(56) References Cited

U.S. PATENT DOCUMENTS

| | | | |
|---|---|---|---|
| 2005/0068019 A1* | 3/2005 | Nakamura | G06F 1/26 323/355 |
| 2011/0115433 A1* | 5/2011 | Lee | H02J 7/025 320/108 |

(Continued)

FOREIGN PATENT DOCUMENTS

| | | |
|---|---|---|
| JP | 08-237890 A | 9/1996 |
| JP | 2011-142559 A | 7/2011 |

(Continued)

*Primary Examiner* — Edward Tso
*Assistant Examiner* — Manuel Hernandez
(74) *Attorney, Agent, or Firm* — Mintz Levin Cohn Ferris Glovsky and Popeo, P.C.; Peter F. Corless

(57) ABSTRACT

A method includes: receiving vehicle information from a wireless charging-capable vehicle via a wireless communication means; calculating an air gap between a primary coil of a wireless charging system that is operable to wirelessly charge the vehicle and a secondary coil of the vehicle based on the received vehicle information; and causing electric current to flow only through a portion of the primary coil having a size that is less than or equal to a size of the entire primary coil. The size of the portion of the primary coil through which the electric current flows is determined based on the calculated air gap between the primary coil and the secondary coil.

22 Claims, 6 Drawing Sheets

(52) U.S. Cl.
CPC ........ *Y02T 10/7055* (2013.01); *Y02T 10/7072* (2013.01); *Y02T 10/7216* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 2012/0098330 A1* | 4/2012 | Ichikawa | .............. | B60L 11/123 307/9.1 |
| 2012/0169279 A1* | 7/2012 | Kim | ........................ | H02J 7/025 320/108 |
| 2014/0008973 A1* | 1/2014 | Elias | ...................... | B60L 11/182 307/10.1 |
| 2014/0191586 A1* | 7/2014 | Ichikawa | ................ | H01F 38/14 307/104 |
| 2014/0340031 A1* | 11/2014 | Mi | ....................... | H04B 5/0037 320/108 |
| 2016/0089997 A1* | 3/2016 | Glanzer | .................. | H02J 7/025 320/108 |
| 2017/0110242 A1* | 4/2017 | Kanno | .................. | H01F 27/365 |
| 2017/0361725 A1* | 12/2017 | Seong | ..................... | H02J 50/90 |

FOREIGN PATENT DOCUMENTS

| | | |
|---|---|---|
| JP | 4947241 B2 | 6/2012 |
| KR | 10-2015-0017637 A | 2/2015 |
| WO | 2011-156768 A2 | 12/2011 |
| WO | 2013-112614 A1 | 8/2013 |
| WO | 2013-141718 A1 | 9/2013 |
| WO | 2014-011059 A1 | 1/2014 |

* cited by examiner

INTEROPERABLE EV WIRELESS CHARGING SYSTEM BASED ON AIR GAP BETWEEN PRIMARY AND SECONDARY COILS

BACKGROUND (a) Technical Field

The present disclosure relates generally to wirelessly charging electric or hybrid electric vehicles, and more particularly, to an interoperable electric vehicle wireless charging method and system.

(b) Background Art

Recently, technology relating to electric vehicles (EVs) and hybrid electric vehicles (HEVs) has been rapidly developing. EVs and HEVs are powered, at least in part, by electricity, and these vehicles often collect and store electricity, or in other words, are charged, from off-vehicle sources. As such, various methods of charging EVs and HEVs have been explored. In particular, techniques for wireless charging, or inductive charging, have been the subject of considerable research.

Wireless charging, as opposed to wired charging, improves durability and longevity of the charging components by limiting contact and exposure of the components, increases safety by concealing potentially dangerous wires and connection interfaces, and enhances versatility by allowing charging stations to be implemented in a variety of ways (e.g., as a portable charging pad, embedded in a parking lot or road, etc.). To this end, wireless charging relies on an electromagnetic field to transfer energy between a charging station (e.g., wireless charging assembly) and an electrical device, such as a smart phone, a laptop, or an electric vehicle, as in the present case. Energy is sent through an inductive coupling formed between the wireless charging assembly and the device. Typically, an induction coil in the wireless charging assembly (e.g., primary coil) uses electricity, often provided from the power grid, to create an alternating electromagnetic field. An induction coil in the electrical device (e.g., secondary coil) may then receive power from the generated electromagnetic field and convert it back into electrical current to charge its battery. As a result, the primary and secondary induction coils combine to form an electrical transformer, whereby energy can be transferred between the two coils through electromagnetic induction.

Notably, the secondary coils installed in wireless charging-capable vehicles come in myriad sizes with varying ground clearance amounts (i.e., the distance from the secondary coil to the ground). Difficulties can arise, therefore, as the varying types of secondary coils cause incompatibilities with certain charging systems. For instance, as the ground clearance of the secondary coil increases (e.g., in a vehicle with a relatively high undercarriage), and the magnetic air gap (the vertical distance between the primary coil of the wireless charging system and the secondary coil of the vehicle) also increases, the energy emitted by the primary coil must increase, as well, in order to efficiently charge the vehicle. This is because the radius of the primary coil (as well as the size of the primary coil) is directly proportional to the air gap that can be overcome in order to perform magnetic resonance energy transfer with high efficiency. Consequently, in the case of a larger magnetic air gap (e.g., in a pick-up truck or sports utility vehicle (SUV) having a high ground clearance), some primary coils may be too small to emit the requisite energy to the vehicle. At the same time, larger primary coils may emit unnecessary amounts of energy in the case of a smaller magnetic air gap (e.g., in a sports car having a low ground clearance), resulting in wasted energy.

SUMMARY OF THE DISCLOSURE

The present disclosure provides techniques for one standard primary system charger to closely couple (i.e., magnetically) with secondary coils of various sizes. As a result, a single primary charging system can be interoperable with vehicles of varying ground clearances. In other words, the wireless charging (i.e., primary coil) system disclosed herein can allow for interoperability between the charging system and vehicles of various magnetic air gap classes. This way, inconveniences stemming from wireless charger incompatibility can be reduced. For instance, cases where wireless charging parking spots are specially designated by air gap compatibility can be eliminated.

According to embodiments of the present disclosure, a method includes: receiving vehicle information from a wireless charging-capable vehicle via a wireless communication means; calculating an air gap between a primary coil of a wireless charging system that is operable to wirelessly charge the vehicle and a secondary coil of the vehicle based on the received vehicle information; and causing electric current to flow only through a portion of the primary coil having a size that is less than or equal to a size of the entire primary coil. The size of the portion of the primary coil through which the electric current flows is determined based on the calculated air gap between the primary coil and the secondary coil.

The portion of the primary coil may be one of a plurality of predefined portions of the primary coil.

The plurality of predefined portions of the primary coil may be defined by an LC circuit in which a plurality of switching elements control whether electric current flows through the plurality of predefined portions of the primary coil.

The method may further include: selecting one or more of the plurality of switching elements based on the calculated air gap between the primary coil and the secondary coil; and activating the selected switching elements, such that electric current flows only through the portion of the primary coil.

The method may further include: defining a portion of the plurality of predefined portions of the primary coil by establishing a size of the defined portion.

The method may further include: evaluating the defined portion based on one or more evaluation criteria.

The method may further include: adjusting the size of the defined portion based on the evaluation of the defined portion.

A size of each predefined portion of the primary coil may be different from that of the other predefined portions of the primary coil.

The plurality of predefined portions of the primary coil may be concentric portions of the primary coil.

The method may further include: causing electric current to flow through a selection of portions among the plurality of predefined portions of the primary coil during a process in which the vehicle is being aligned with the wireless charging system.

A shape of the primary coil may be square-like, rectangle-like, circle-like, or oval-like.

A coil winding pattern of the primary coil may be substantially evenly distributed throughout the primary coil.

A coil winding pattern of the primary coil is substantially may follow a logarithmic-like distribution pattern.

The calculated air gap between the primary coil and the secondary coil may correspond to one of a plurality of predefined ranges of air gap between the primary coil and the secondary coil.

The method may further include: determining which of the plurality of predefined ranges of air gap between the primary coil and the secondary coil corresponds to the calculated air gap between the primary coil and the secondary coil.

The plurality of predefined ranges of air gap between the primary coil and the secondary coil may include at least a first range of air gap and a second range of air gap, which is greater than the first range of air gap.

The portion of the primary coil may be one of a plurality of predefined portions of the primary coil, and the calculated air gap between the primary coil and the secondary coil may correspond to one of a plurality of predefined ranges of air gap between the primary coil and the secondary coil.

The method may further include: determining the portion of the primary coil, among the plurality of predefined portions of the primary coil, based on the predefined range of air gap between the primary coil and the secondary coil to which the calculated air gap corresponds.

For each predefined range of air gap between the primary coil and the secondary coil, there may be a corresponding predefined portion of the primary coil.

The received vehicle information indicates one or more of: a distance of the secondary coil from the ground, a distance of an undercarriage portion of the vehicle from the ground, and details relating to installation of the secondary coil in the vehicle.

The calculating of the air gap between the primary coil and the secondary coil may further include: determining a distance of the secondary coil from the ground based on the received vehicle information; determining a distance of the primary coil from the ground; and calculating the air gap between the primary coil and the secondary coil based on a difference between the distance of the secondary coil from the ground and the distance of the primary coil from the ground.

The electric current flowing through the portion of the primary coil may wirelessly charge the vehicle.

Furthermore, according to embodiments of the present disclosure, a wireless charging system includes: wireless communication means wirelessly receiving vehicle information from a wireless charging-capable vehicle; a controller calculating an air gap between a primary coil of the wireless charging system that is operable to wirelessly charge the vehicle and a secondary coil of the vehicle based on the received vehicle information; and an LC circuit causing electric current to flow only through a portion of the primary coil having a size that is less than or equal to a size of the entire primary coil. The size of the portion of the primary coil through which the electric current flows is determined based on the calculated air gap between the primary coil and the secondary coil.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
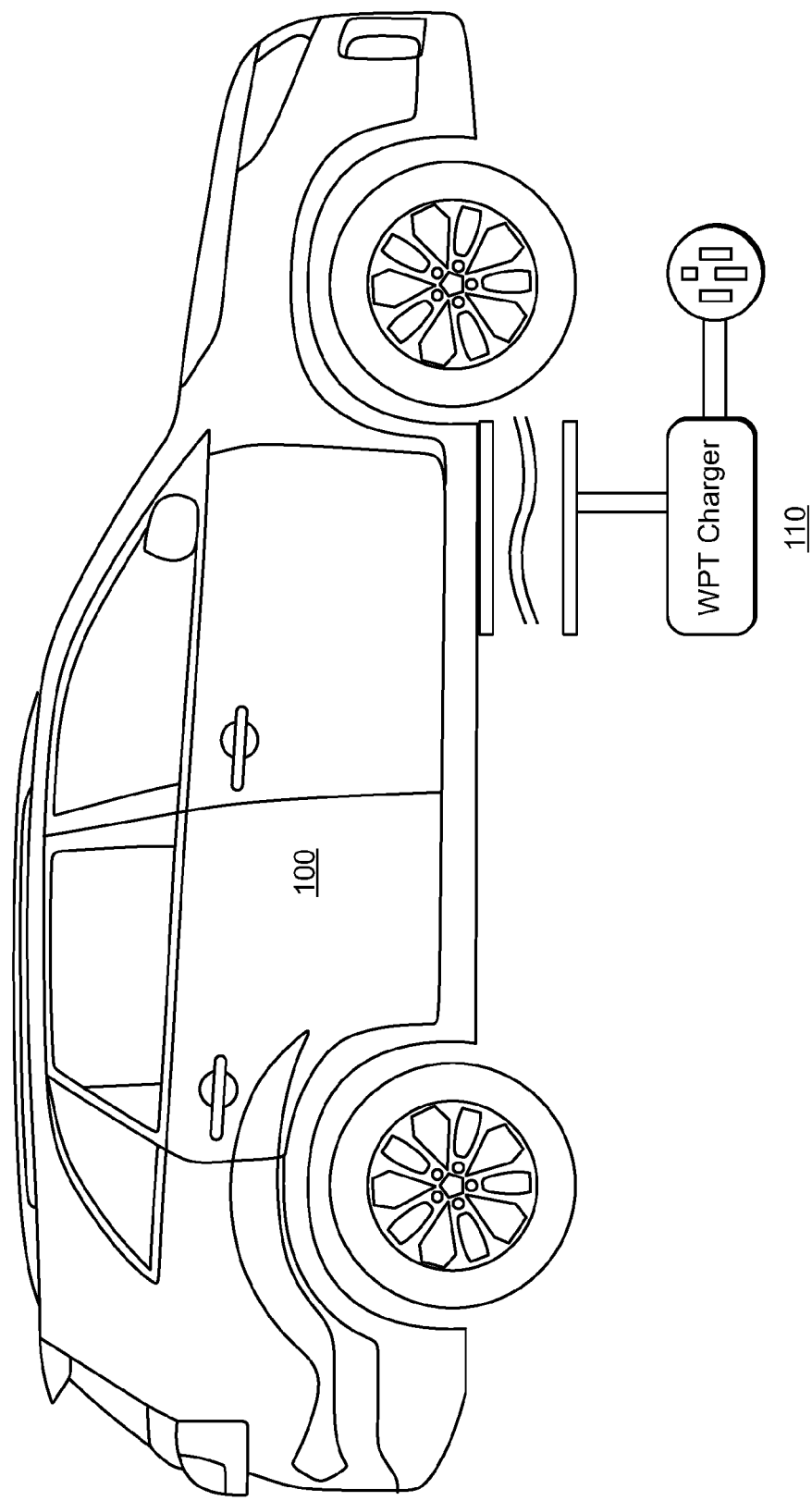
FIG. 1 illustrates an example schematic depiction of wireless charging-capable vehicle in conjunction with a wireless charging system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Wireless charging, wirelessly transferring power, or the like, may refer to transferring any form of energy associated with electric fields, magnetic fields, electromagnetic fields, or otherwise from a transmitter to a receiver without the use of physical electrical conductors (e.g., power may be transferred through free space). The power output from a first (e.g., "primary") coil into a wireless field (e.g., a magnetic field) may be received or captured by a second (e.g., "secondary" or "receiving") coil to achieve power transfer.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by wireless charging system comprising the controller, as described in detail below.

Referring now to embodiments of the present disclosure, the disclosed techniques allow for one standard primary system charger to closely couple (i.e., magnetically) with secondary coils of various sizes. As a result, a single primary charging system can be interoperable with vehicles of varying ground clearances. In other words, the wireless charging (i.e., primary coil) system disclosed herein can allow for interoperability between the charging system and vehicles of various magnetic air gap classes. The interoperable charging system may be accomplished by a primary coil having a plurality of portions, where each portion may be independently activated (i.e., an electric current flows therethrough). The plurality of primary coil portions may be concentric (or coaxial) portions, and the portions may be differently sized. That is, each portion of the primary coil may have a unique radius. This way, one or more of the primary coil portions may be activated so as to couple the activated primary coil portion(s) to a secondary coil of the same or similar size, thereby allowing for efficient magnetic air gap transfer, despite varying secondary coil sizes and magnetic air gaps.

FIG. 1 illustrates an example schematic depiction of wireless charging-capable vehicle in conjunction with a wireless charging system. As shown in FIG. 1, a vehicle 100 may be an EV, HEV, or the like, that is be capable of being wirelessly charged. That is, an inductive coil (e.g., secondary coil) may be installed in the vehicle 100, whereby the coil is operable to receive energy wirelessly transmitted from an inductive coil of a wireless charging system (e.g., via an electromagnetic field generated through an inductive coupling between the coils). The vehicle 100 may be aligned with the wireless charging system 110, as shown in FIG. 1, in order to wirelessly receive energy from the charging system 110 (the process of which being described hereinabove).

The wireless charging system 110 may embody induction coils (e.g., primary coils) that use electricity in order to create an electromagnetic field and, ultimately, wirelessly charge the nearby vehicle 100. The wireless charging system 110 may be connected to and receive electric current from a local distribution center (e.g., power grid), or any other suitable energy source. The wireless charging system 110 may be positioned in any suitable area (e.g., a parking spot in a parking lot, a garage, roadway, etc.) and implemented in any suitable manner, such as a portable charging pad or embedded in or under the ground. In particular, the wireless charging system 110 may be positioned and implemented such that the vehicle 100 can be driven and/or parked sufficiently proximate to the wireless charging system 110, and the vehicle may wirelessly receive electricity transferred from the charging system 110.

As an example, the wireless charging system 110 may be embodied as a portable charging pad connected to a local power distribution center, whereby the vehicle 100 can be driven and/or parked over the charging pad. As another example, the wireless charging system 110 may be embedded in the ground (e.g., partially underground or entirely underground) and connected to the local power distribution center, whereby the vehicle 100 can be driven and/or parked over the area of ground in which the wireless charging system 110 is embedded. In both cases, or any other suitable case, the vehicle is 100 capable of being driven and/or parked sufficiently proximate to the wireless charging system 110, such that the secondary (i.e., receiving) coils installed in the vehicle 100 are capable of being aligned with the primary coils of the charging system 110.

Figure 2:
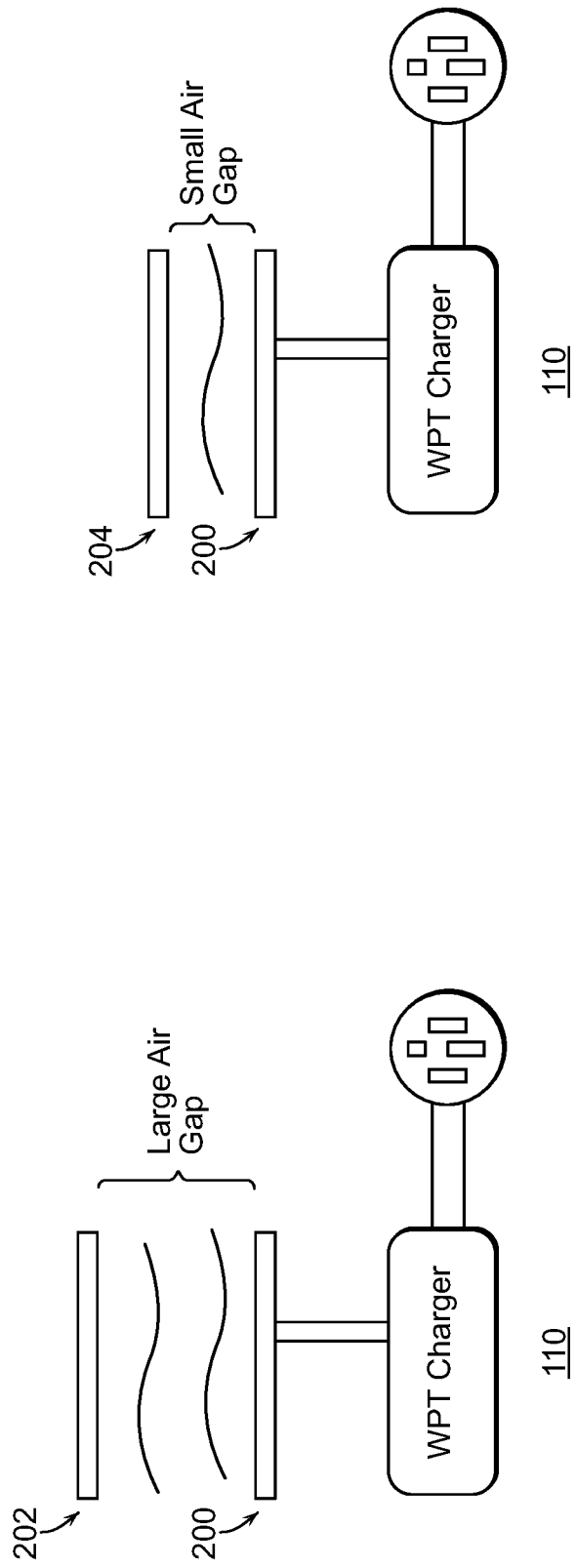
FIG. 2 illustrates an example schematic depiction of magnetic air gap classes.

During a wireless transfer of energy, there is an amount of space (air space) in the vertical (i.e., up-and-down) direction between the primary charger of the charging system 110 and the secondary coil of the vehicle 100, known as the magnetic air gap (alternatively referred to as the "air gap" or "Z-gap"). In this regard, FIG. 2 illustrates an example schematic depiction of magnetic air gap classes. As shown in FIG. 2, a primary coil 200 of the wireless charging system 110 may be inductively coupled to an example first secondary coil 202 or an example second secondary coil 204. The secondary coils 202 or 204 may be installed in a wireless-charging capable vehicle, such as the vehicle 100. The surrogate vehicle's natural ground clearance and secondary coil installation details will typically determine the magnetic air gap. For example, a sports car may have a low ground clearance, and thus a small magnetic air gap, a pick-up truck or SUV may have a high ground clearance, and thus a large magnetic gap, and a sedan may have a ground clearance that is between that of a sports car and SUV, and thus a medium magnetic gap.

To illustrate, in FIG. 2, a large air gap is shown between the primary coil 200 and first secondary coil 202, while a small air gap is shown between the primary coil 200 and second secondary coil 204. Because the distance from the primary coil 200 to the first secondary coil 202 is greater than the distance from the primary coil 200 to the second secondary coil 204, greater transmission power in the primary coil 200 is necessary to efficiently transfer energy to the secondary coil 202, and less transmission power in the primary coil 200 is necessary to efficiently transfer energy to the secondary coil 204. Consequently, if using conventional wireless charging systems, different charging assemblies are necessary to wirelessly transfer energy to the first secondary coil 202 and to the second secondary coil 204 in the case of a large air gap and a small air gap, respectively. According to embodiments of the present disclosure, however, a single wireless charging system, e.g., charging system 110, may be interoperable with any secondary coil, such as secondary coils 202 and 204, across multiple classes of air gaps, as described in further detail below.

Figure 3:
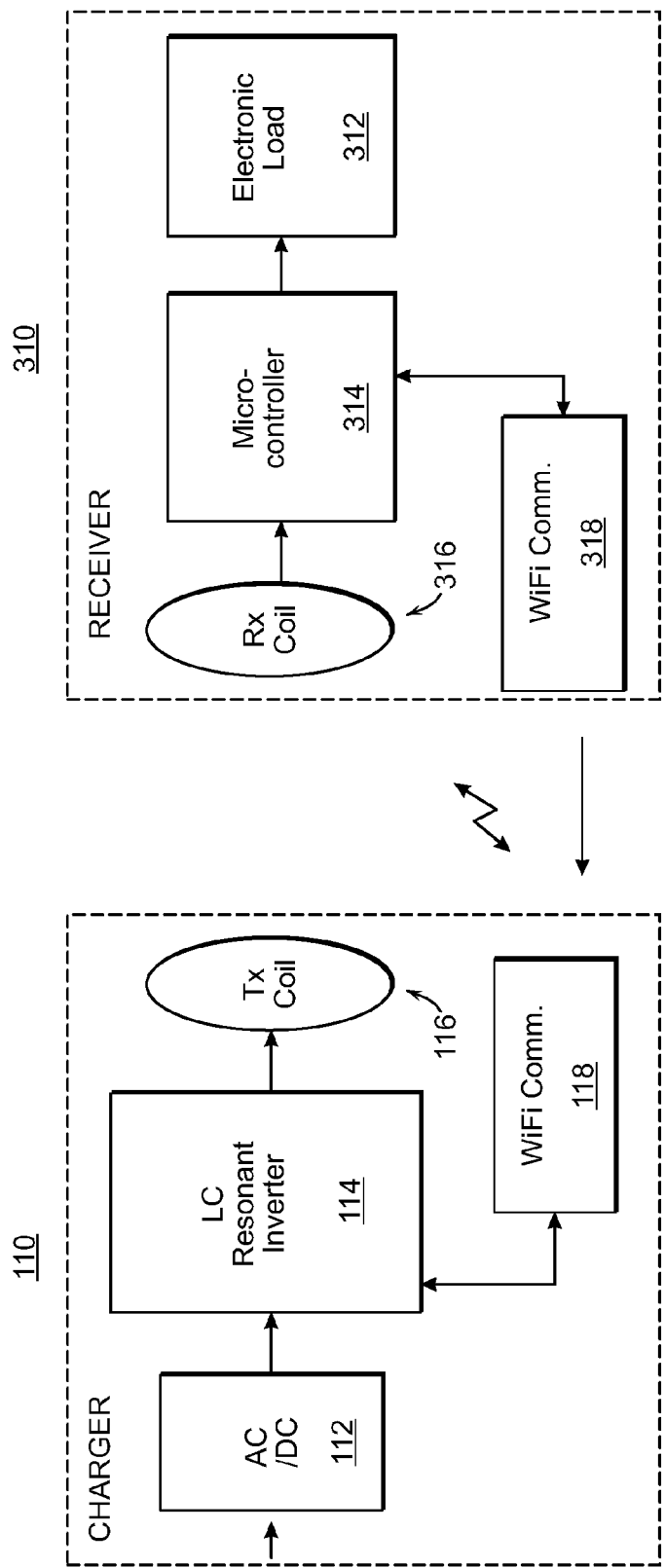
FIG. 3 illustrates an example schematic depiction of a wireless charging system and receiver.

FIG. 3 illustrates an example schematic depiction of a wireless charging system and receiver. As shown in FIG. 3, a wireless charging system 110 (e.g., "charger") wirelessly communicates with and transfers energy to wireless receiver 310 (e.g., "receiver"). In particular, the charging system 110 may include an AC/DC front end 112, LC resonant inverter 114, primary coil 116 (e.g., "Tx Coil"), and wireless communication means 118 (e.g., "WiFi Comm."). The wireless receiver 310 may include an electronic load 312, microcontroller 314, secondary coil 316 (e.g., "Rx Coil"), and wireless communication means 318 (e.g., "WiFi Comm."). Notably, the configurations of the wireless charging system 110 and receiver 310 shown in FIG. 3 are for demonstration purposes only and should not be treated as limiting the same to the depicted configuration. Rather, the wireless charging system 110 and receiver 310 may be configured in any suitable manner in accordance with the scope of the present claims.

In the wireless receiver 310, which may be embodied in a wireless charging-capable vehicle, e.g., vehicle 100, the secondary coil 316 (having a radius proportional to the magnetic air gap) may have a voltage induced by the magnetic field generated by electric current flowing through the primary coil 116. Wireless power transfer can occur between 80 kHz-90 kHz. The microcontroller 314 may control the operation of the receiver 310. For the purposes of the present disclosure, the microcontroller 314 may include a rectifier, e.g., for converting the AC into DC in order to charge the electronic load 312 (e.g., battery), and/or a filter, e.g., for filtering the received electric current. The wireless communication means 318 may wirelessly transmit information (e.g., "vehicle information") pertaining to the vehicle in which the wireless receiver 310 is installed (e.g., vehicle 100) to the wireless communication means 118, as described further below.

In the wireless charging system 110, the AC/DC front end 112 may receive electric current from a power source (e.g., a power plant) and convert the current from alternating current (AC) into high-voltage direct current (DC). As an example, the AC/DC front end 112 may convert a 60 Hz AC into 525 V DC. The converted DC may then be outputted from the AC/DC front end 112 to the LC resonant inverter 114. The circuitry of the LC resonant inverter 114 may be variously configured and may embody, for instance, an LC (inductor-capacitor) circuit, capacitors (in series or parallel), and bridge circuitry, as described in further detail below. Additionally, the LC resonant inverter 114 may include drive electronics (e.g., to drive the capacitors and primary coil) at a suitable frequency (e.g., SAE standard frequency of 85 kHz).

Figure 5:
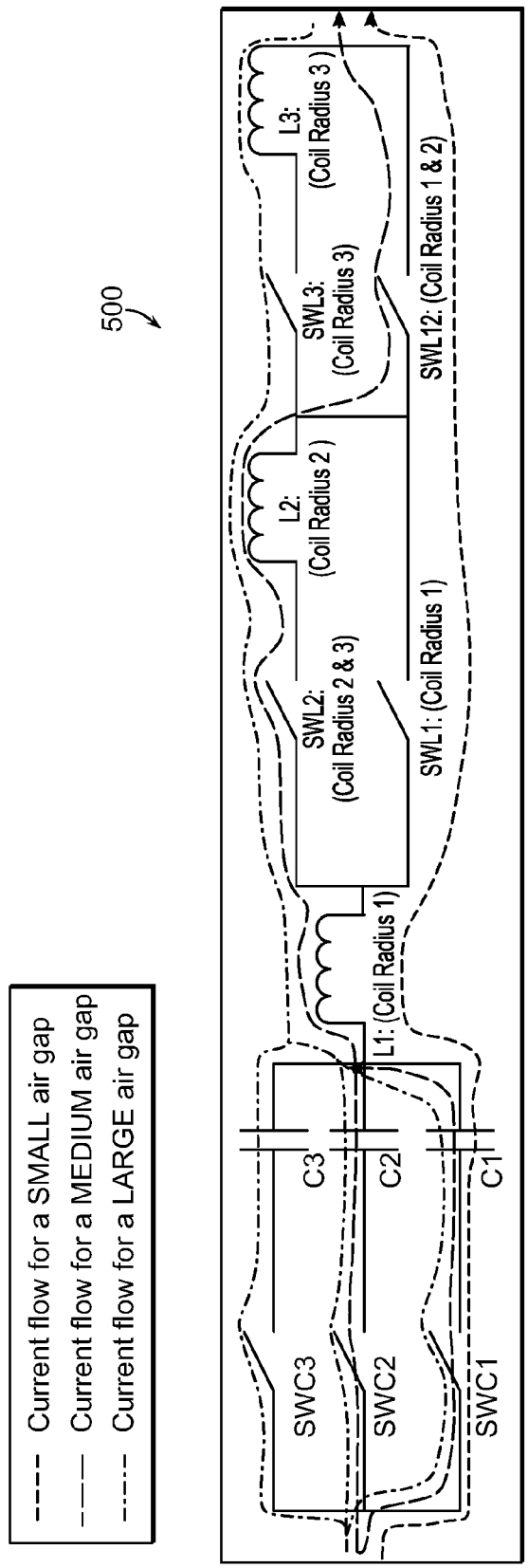
FIG. 5 illustrates an example circuit diagram of an adaptable, interoperable LC circuit according to the present disclosure.

The operation of the LC resonant inverter 114 may consist of turning on one high side switch (MOSFET) with an adjacent low side switch (MOSFET) to allow current flow in one direction through the load. The load may embody an LC circuit comprising series-connected capacitors (or bank of capacitors in parallel) with a conductor in a circular coil that acts as an inductor. In order to achieve an AC current flow through the load, the original switches may be turned off, while the opposing switches are turned on. As a result, the LC resonant inverter 114 is capable of achieving magnetic resonance via the LC circuit, which is illustrated in FIG. 5 and described in detail below.

The charging system 110 may wirelessly communicate with the receiver 310 via the wireless communication means 118 and 318. Specifically, the wireless communication means 318 may wirelessly transmit information (e.g., "vehicle information") pertaining to the vehicle in which the wireless receiver 310 is installed (e.g., vehicle 100) to the wireless communication means 118. Upon establishment of wireless communications between the wireless communication means 118 and 318, the transmission of vehicle information from the wireless communication means 318 to the wireless communication means 118 of the charging system 110 may transpire (e.g., prior to initiating the charge of the vehicle 100). The vehicle information may include information used by the charging system 110 to calculate the air gap between the primary coil 116 and secondary coil 316. The vehicle information may indicate, for example, a distance of the secondary coil 316 from the ground, a distance of an undercarriage portion of the vehicle 100 from the ground, and/or details relating to installation of the secondary coil 316 in the vehicle 100.

Using the received vehicle information, the charging system 110 may determine the magnetic air gap between the primary coil 116 and secondary coil 316. Alternatively, the magnetic air gap may be the distance between the primary coil 116 and the undercarriage of the vehicle 100. The determination of the air gap may be performed by a controller in the charging system 110 (not shown). For instance, if the received vehicle information includes an indication of the distance of the secondary coil 316 from the ground (e.g., Z-axis coordinate of the secondary coil 316), the charging system 110 may subtract its own distance measured from the ground (e.g., Z-axis coordinate of the primary coil 116) to determine the air gap between the two devices (if the charging system 110 is underground, the Z-axis coordinate of the primary coil 116 may be a negative number).

The magnetic air gap measurements may be divided into multiple classes (e.g., ranges). The air gap ranges may be predefined, as shown in Table 1 (below), and the ranges may include at least a first range and a second range that is greater than the first range. For example, magnetic air gap classes may be defined according to the following Table 1:

| Air Gap Class | Range |
| --- | --- |
| Small Air Gap: | 80-160 mm |
| Medium Air Gap: | 161-220 mm |
| Large Air Gap: | 221-280 mm |

Notably, the air gap classes shown in Table 1 are for demonstration purposes only and should not be treated as limiting the same to the depicted classes. Rather, the classes of air gap between the primary coil 116 and the secondary coil 316 may be defined in any suitable manner in accordance with the scope of the present claims.

In order for the charging system 110 to efficiently charge the vehicle 100 over the air gap between the primary coil 116 and secondary coil 316, the size of the primary coil 116 must be sufficient to transfer power over the air gap. Problematically, conventional primary coils are often efficient with only a particular air gap class. For example, in the case of a larger magnetic air gap (e.g., in a pick-up truck or SUV having a high ground clearance), some primary coils may be too small to emit the requisite energy to the vehicle. Conversely, larger primary coils may emit unnecessary amounts of energy in the case of a smaller magnetic air gap (e.g., in a sports car having a low ground clearance), resulting in wasted energy. Difficulties can arise, therefore, as the varying types of secondary coils cause incompatibilities with certain charging systems. For instance, as the ground clearance of the secondary coil 316 increases, and the air gap increases accordingly, the energy emitted by the primary coil 116 must increase, as well, in order to efficiently charge the vehicle. This is because the radius of the primary coil 116 (as well as the size of the primary coil 116) is directly proportional to the air gap that can be overcome in order to perform magnetic resonance energy transfer with high efficiency.

Therefore, according to embodiments of the present disclosure, a specific portion of the primary coil 116 may be activated (i.e., electric current flows therethrough) based on the calculated air gap between the primary coil 116 and the secondary coil 316, such that the electromagnetic field generated by a current flowing through the activated portion of the primary coil 116 efficiently transfers power to the receiver 310 (via the inductive coupling with the secondary coil 316). The size of the activated primary coil portion determines the number of coil turns in the activated portion, and as a circular coil of a current carrying conductor increases its number of turns, it will naturally introduce more inductance to the circuit. Thus, the charging system 110 may cause electric current to flow only through a portion of the primary coil 116, whereby the size of the portion of the primary coil 116 through which the electric current flows is determined based on the calculated air gap between the primary coil 116 and the secondary coil 316. This way, the power transferred from the primary coil 116 can be commensurate with the secondary coil 316 of the vehicle 100, and particularly, the air gap between the primary coil 116 and the secondary coil 316.

Figure 4:
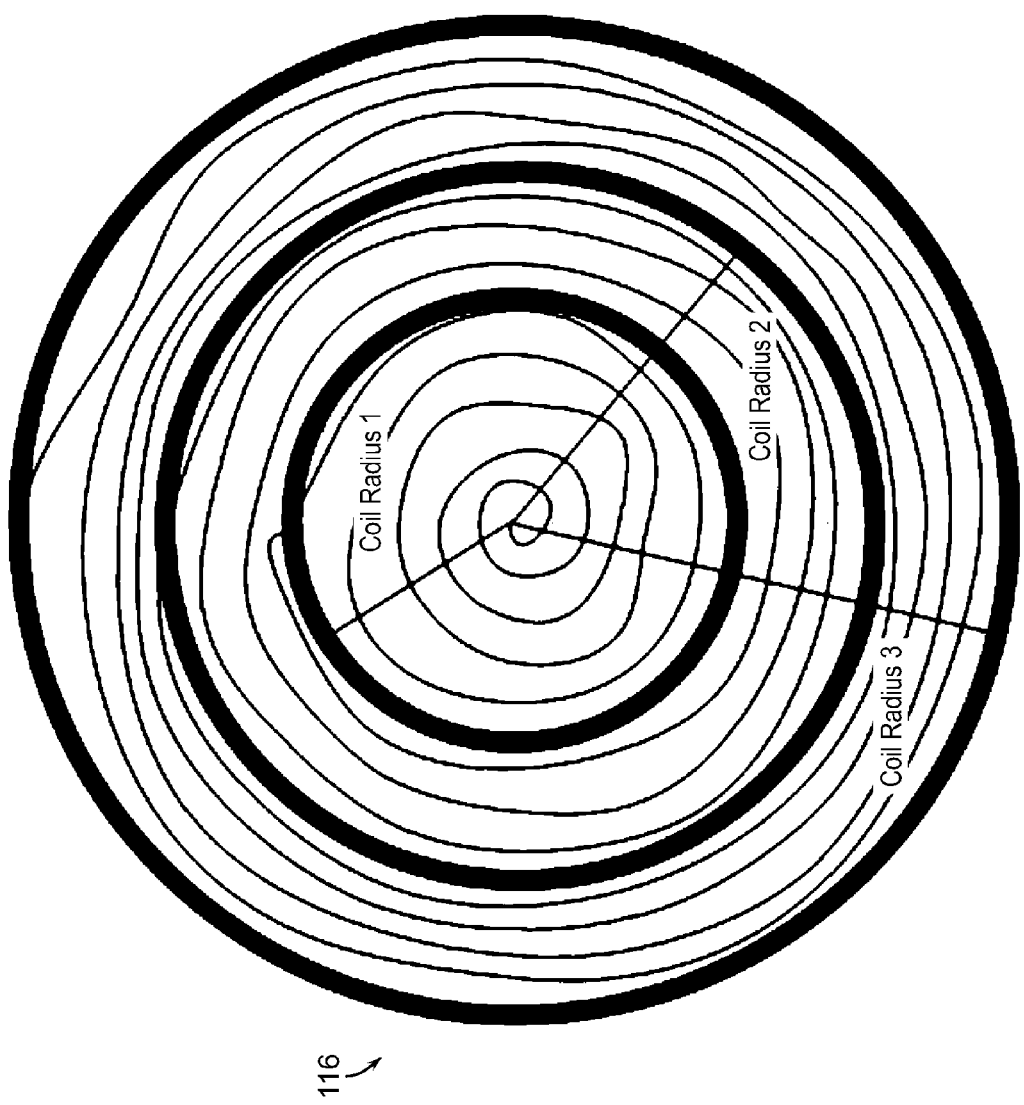
FIG. 4 illustrates an example schematic depiction of an interoperable electric vehicle circular coil.

Notably, the radius of the activated portion of the primary coil 116 (i.e., the portion through which electric current flows) may be directly proportional to the calculated amount of air gap. In this regard, FIG. 4 illustrates an example schematic depiction of an interoperable electric vehicle circular coil. As shown in FIG. 4, the primary coil 116 includes a plurality of predefined portions, allowing the primary coil 116 to couple tightly to the secondary coil 316 based on the air gap, thus achieving efficient magnetic air gap transfer. Each predefined portion has a unique size/radius and a unique number of coil turns. For instance, a first portion of the primary coil 116 has a radius of "Coil Radius 1," a second portion of the primary coil 116 has a radius of "Coil Radius 2," and a third portion of the primary coil 116 has a radius of "Coil Radius 3."

Certain predefined portions of the primary coil 116 encompass other (i.e., smaller) primary coil portions. Illustratively, the second portion of the primary coil 116 encompasses the first portion of the primary coil 116, and the third portion of the primary coil 116 encompasses the first and second portions of the primary coil 116. Because of this, the first portion of the primary coil 116 is achieved by activating Coil Radius 1 alone; the second portion of the primary coil 116 is achieved by engaging Coil Radius 1 and 2; and the third portion of the primary coil 116 is achieved by engaging Coil Radius 1, 2 and 3. Notably, the configuration of the primary coil 116 shown in FIG. 4 is for demonstration purposes only and should not be treated as limiting the same to the depicted configuration. Rather, portions of the primary coil 116 may be defined in any suitable manner (e.g., by choosing a size/radius or a number of coil turns of a given portion). The predefined portions of the primary coil 116 may be concentric or coaxial, as shown in FIG. 4, or may be configured in any other suitable manner.

Alternatively, the shape of the primary coil 116 may be square-like, rectangle-like, circle-like, or oval-like. Further, a coil winding pattern of the primary coil may be substantially evenly distributed throughout the primary coil or may substantially follow a logarithmic-like distribution pattern. Even further, any of the primary coil portions may be evaluated based on one or more evaluation criteria, such as, for example, overall efficiency, charge rate, etc. The evaluation may be performed on a trial and error basis. Yet even further, the wireless charging system 110 may cause electric current to flow through one or more portions of the primary coil 116 during a process in which the vehicle 100 is being aligned with the charging system 110. This way, various coil radius activations may be triggered to emit electromagnetic fields so as to indicate the center of the coil 116, thereby aiding in the vehicle alignment process.

For each predefined range of air gap between the primary coil 116 and the secondary coil 316, there may be a corresponding predefined portion of the primary coil 116. Thus, the portion of the primary coil 116 through which electric current will flow may be determined based on the predefined range of air gap (e.g., small, medium, large, etc.) corresponding to the calculated air gap (e.g., the distance between the primary coil 116 and the secondary coil 316).

For example, the first portion of the primary coil 116 (e.g., Coil Radius 1) may be activated for a "small" air gap, the second portion of the primary coil 116 (e.g., Coil Radius 1 and 2) may be activated for a "medium" air gap, and the third portion of the primary coil 116 (e.g., Coil Radius 1, 2 and 3) may be activated for a "large" air gap. This way, a smaller magnetic field may be generated in the case of a smaller air gap, and conversely, a larger magnetic field may be generated in the case of a larger air gap, despite using only a single primary coil. That is, the primary coil 116 may be interoperable with any type of secondary coil.

Electric current may flow only through a particular portion of the primary coil 116 due to an LC circuit in the wireless charging system 110. As explained above, the LC resonant inverter 114 may embody an LC circuit (e.g., tank circuit or resonant circuit) consisting of a plurality of inductors and a plurality of capacitors interconnected with one another. The LC circuit can store electrical energy oscillating at its resonant frequency. Specifically, the capacitors may stores energy using their respective local electric field (i.e., between its plates), and the inductors may store energy in their created magnetic field, depending on the electric current running therethrough.

In an LC circuit, charge will start to flow through the inductor when a charged capacitor is connected across an inductor, thereby generating a magnetic field around the inductor and reducing the voltage on the capacitor. After a period of time, all of the charge on the capacitor is removed, and the voltage across it reaches zero. However, the current flow can continue since the inductor resists changes in current. That is, the energy to keep the current flowing is extracted from the created magnetic field. When the magnetic field surrounding the inductor has dissipated, the current will stop and the charge will again be stored in the capacitor, only with the opposite polarity as before. As a result, the electric current begins to flow through the LC circuit in the opposite direction.

Eventually, the charge flows back and forth between the plates of the capacitor and through the inductor, and the energy oscillates back and forth until internal resistance causes the oscillations to die out (absent additional power from an external source). The resonance effect occurs when the inductive and capacitive reactances are equal in magnitude. The frequency at which this equality is achieved (for a given circuit) is the resonant frequency. An LC circuit has a natural electrical resonant frequency determined by the relationship of values defined in Equations 1 and 2 (below). The angular resonant frequency of the LC circuit can be calculated according to the following Equation 1:

$$\omega_0 = \frac{1}{\sqrt{LC}}. \qquad \text{[Equation 1]}$$

The angular resonant frequency of the LC circuit can be calculated in Hz according to the following Equation 2:

$$\omega_0 = 2\pi f_0 \qquad \text{[Equation 2]}.$$

FIG. 5 illustrates an example circuit diagram of an adaptable, interoperable LC circuit according to the present disclosure. As shown in FIG. 5, a resonant LC circuit 500 is adaptable to multiple possible air gap classes (e.g., small, medium, large, etc.) which can vary according to the particular vehicle interfacing with the charging system 110. In order to maintain a consistent resonant frequency, the LC circuit 500 may be configured to include a plurality of capacitors (e.g., C1, C2, C3, etc.) that are connected (either directly or indirectly) to a plurality of inductors (e.g., L1, L2, L3). The inductors in the LC circuit 500 may correspond to the predefined portions of the primary coil 116, as shown in FIG. 4. In particular, as shown in FIG. 5, the inductor L1 may correspond to the aforementioned first portion of the primary coil 116 (e.g., Coil Radius 1), the inductor L2 may correspond to the aforementioned second portion of the primary coil 116 (e.g., Coil Radius 2), and the inductor L3 may correspond to the aforementioned third portion of the primary coil 116 (e.g., Coil Radius 3). Notably, the configuration of the LC circuit 500 shown in FIG. 5 is for demonstration purposes only and should not be treated as limiting the same to the depicted configuration. Rather, the LC circuit 500 may be configured in any suitable manner in accordance with the scope of the present claims.

Electric current may flow through the LC circuit 500 along a path determined by a plurality of switching elements (e.g., SWC1, SWC2, SWC3, SWL1, SWL2, SWL3, SWL12, etc.). Because more inductance is naturally introduced into the LC circuit 500, as the number of turns (in a circular coil) of a current-carrying conductor increases, capacitance must be added to the circuit to maintain a consistent resonant frequency. Thus, as capacitance is added (e.g., by adding more capacitors in parallel) and inductance is added (e.g., by adding more turns to an inductor), a consistent ratio of capacitance to inductance can be maintained by manipulating the switching elements in the circuit 500.

The current flow path in the LC circuit 500 may be determined based on a particular configuration of switching elements being either opened or closed. That is, the current flow path can change based on any one of the switching elements in the LC circuit 500 being in an opened or closed state. The switching elements may be manipulated (i.e., opened or closed) according to the calculated air gap between the primary coil 116 and the secondary coil 316 (e.g., by a controller in the charging system 110). This way, electric current may flow through the LC circuit 500, and particularly, through the inductors L1, L2, and/or L3, in a manner commensurate with the calculated magnetic air gap.

For instance, as shown in FIG. 5, in the case of a small air gap, switching elements in the LC circuit 500 may be manipulated such that electric current flows through the capacitor C1 and inductor L1 only. As a result, electric current may flow through the aforementioned first portion of the primary coil 116 (i.e., Coil Radius 1) only. Further, as shown in FIG. 5, in the case of a medium air gap, switching elements in the LC circuit 500 may be manipulated such that electric current flows through the capacitors C1 and C2 and inductors L1 and L2 only. As a result, electric current may flow through the aforementioned second portion of the primary coil 116 (i.e., Coil Radius 1 and 2) only. Further, as shown in FIG. 5, in the case of a large air gap, switching elements in the LC circuit 500 may be manipulated such that electric current flows through the capacitors C1, C2, and C3 and inductors L1, L2, and L3. As a result, electric current may flow through the aforementioned third portion of the primary coil 116 (i.e., Coil Radius 1, 2 and 3).

Figure 6:
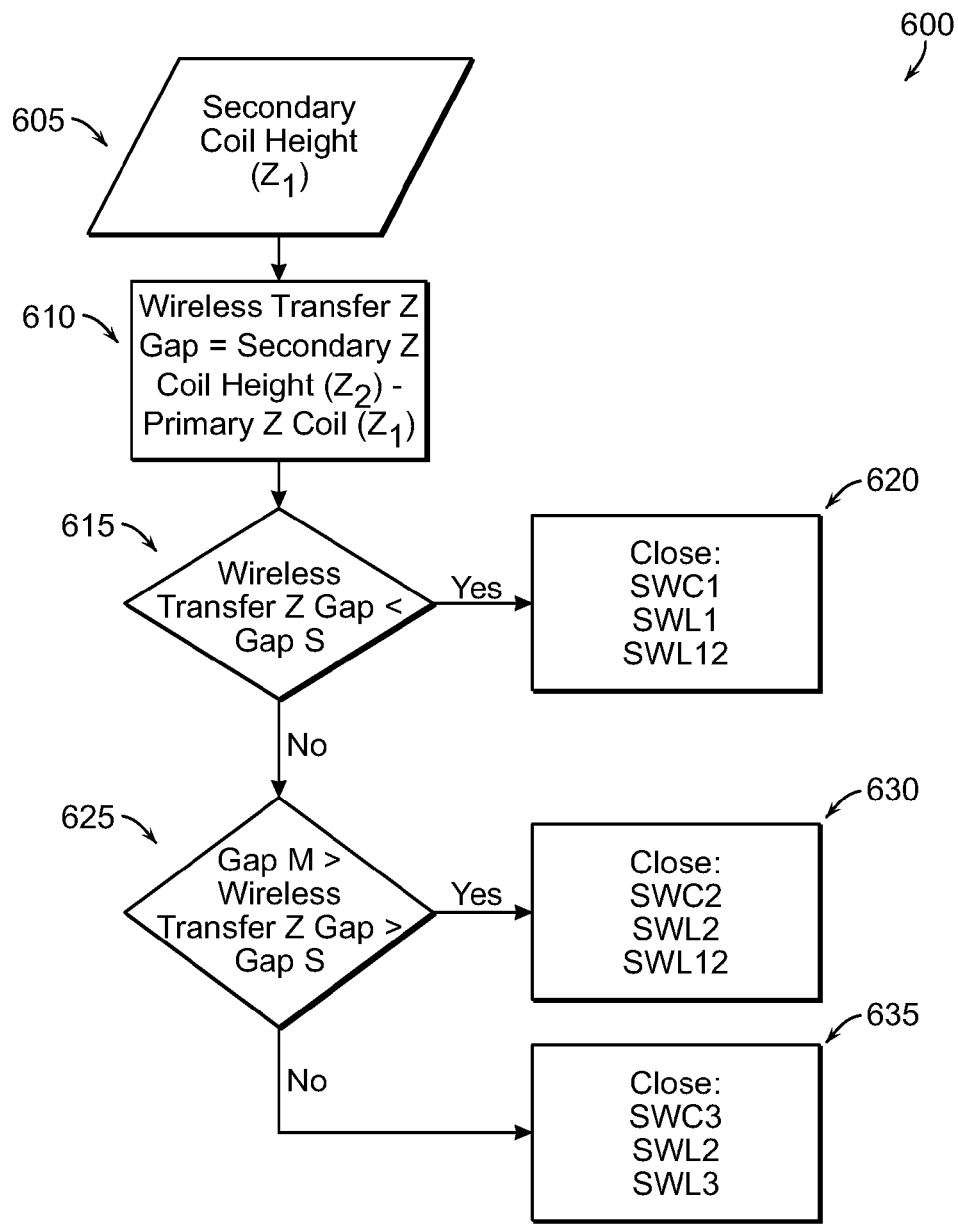
FIG. 6 illustrates an example simplified procedure for controlling the LC circuit according to the calculated air gap.

FIG. 6 illustrates an example simplified procedure for controlling the LC circuit according to the calculated air gap. The procedure 600 may start at step 605, and continue to step 610, where, as described in greater detail above, switching elements of the LC circuit 500 may be manipulated in order to activate the appropriate coil radius (i.e., portion) and circuit capacitance.

At step 605, the secondary coil height (e.g., distance from the ground to the secondary coil 316) can be determined. The secondary coil height may be determined based on vehicle information wirelessly transmitted to the charging system 110. Specifically, the vehicle information may be transmitted from the wireless communication means 318 in the vehicle 100 and received at the wireless communication means 118 in the wireless charging system 110. The vehicle information may indicate, for example, a distance of the secondary coil 316 from the ground, a distance of an undercarriage portion of the vehicle 100 from the ground, and/or details relating to installation of the secondary coil 316 in the vehicle 100.

At step 610, the air gap (e.g., "wireless transfer Z gap") between the primary coil 116 and secondary coil 316 may be calculated (e.g., by a controller in the charging system 110) based on the received vehicle information, and particularly, the determined secondary coil height. If the primary coil 116 is located at a position even with the ground, the air gap may be equivalent to the height of the secondary coil 316 (from the ground). But if the primary coil 116 is not located at a position even with the ground (i.e., the height of the primary coil 116 (from the ground) is not zero), the air gap may be calculated by subtracting the primary coil height from the secondary coil height. Other information wirelessly provided from the vehicle 100 to the charging system 110 may be used in determining the magnetic air gap, as well as the air gap class, such as a distance of an undercarriage portion of the vehicle 100 from the ground and/or details relating to installation of the secondary coil 316 in the vehicle 100.

After the air gap between the primary coil 116 and the secondary coil 316 is calculated, the manner by which to manipulate the switching elements in the LC circuit 500 may be determined using a logic-based process, such as that which is depicted in FIG. 6. However, the arrangement of procedures in steps 615 to 635 is for demonstration purposes only and should not be treated as limiting the same to the depicted arrangement. That is, any procedure for determining switching element states in the LC circuit 500, in order to activate an appropriate portion of the primary coil 116 based on the calculated air gap, may be executed.

For the purposes of FIG. 6, it should be assumed three air gap classes (e.g., small, medium, and large) and three corresponding primary coil portions (e.g., Coil Radius 1, 2 and 3) have been defined. Each air gap class may be associated with an air gap range having an upper and lower limit, such as that described in Table 1. Accordingly, at step 615, it may be determined whether the calculated air gap (e.g., "wireless transfer Z gap") between the primary coil 116 and secondary coil 316 is less than (or equal to) the upper limit of the small air gap class. In other words, it may be determined whether the calculated air gap corresponds to the small air gap class. If so, the procedure 600 may continue to step 620, where switching elements SWC1, SWL1, and SWL12 may be closed (the remaining switching elements are open). Consequently, electric current may flow through capacitor C1 and inductor L1 (e.g., Coil Radius 1 of primary coil 116). Conversely, the electric current would not flow through capacitors C2 and C3 and inductors L2 and L3.

If the calculated air gap between the primary coil 116 and secondary coil 316 is not less than (or equal to) the upper limit of the small air gap class (i.e., the calculated air gap does not correspond to the small air gap class), the procedure 600 may continue to step 625. There, it may be determined whether the calculated air gap is less than (or equal to) the upper limit of the medium air gap class. In other words, it may be determined whether the calculated air gap corresponds to the medium air gap class. If so, the procedure 600 may continue to step 630, where switching elements SWC2, SWL2, and SWL12 may be closed (the remaining switching elements are open). In addition, switching element SWC1 may also be closed, such that electric current flows through capacitors C1 and C2, in order to maintain a consistent ratio of capacitance to inductance (since current would flow through inductors L1 and L2). Consequently, electric current may flow through capacitors C1 and C2 and inductors L1 and L2 (e.g., Coil Radius 1 and 2 of primary coil 116). Conversely, the electric current would not flow through capacitor C3 and inductor L3.

If the calculated air gap between the primary coil 116 and secondary coil 316 is not less than (or equal to) the upper limit of the medium air gap class (i.e., the calculated air gap does not correspond to the small or medium air gap class), the procedure 600 may continue to step 635. In this case, it may be determined that the calculated air gap is greater than the upper limit of the medium air gap class and thus corresponds to the large air gap class. Therefore, in step 635, switching elements SWC3, SWL2, and SWL3 may be closed (the remaining switching elements are open). In addition, switching elements SWC1 and SWC2 may also be closed, such that electric current flows through capacitors C1, C2, and C3, in order to maintain a consistent ratio of capacitance to inductance (since current would flow through inductors L1, L2, and L3). Consequently, electric current may flow through capacitors C1, C2, and C3 and inductors L1, L2, and L3 (e.g., Coil Radius 1, 2 and 3 of primary coil 116). Electric current would flow through the entire primary coil 116 in this case.

The procedure 600 illustratively ends at either step 620, 630 or 635, depending on the calculated air gap. The techniques by which the steps of procedure 600 may be performed, as well as ancillary procedures and parameters, are described in detail above.

It should be noted that the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Accordingly, techniques are described herein that provide for a single primary charging system that is interoperable with vehicles of varying ground clearances. The wireless charging system disclosed herein can allow for interoperability between the charging system and vehicles of various magnetic air gap classes. This way, inconveniences stemming from wireless charger incompatibility can be reduced. Moreover, the disclosed techniques embody a low-cost system as the only added cost to a conventional wireless charging system are the solid state switches and distributed capacitor values.

While there have been shown and described illustrative embodiments that provide for an interoperable electric vehicle wireless charging method and system, it is to be understood that various other adaptations and modifications may be made within the spirit and scope of the embodiments herein. For example, the embodiments have been primarily shown and described herein with relation to particular configurations, procedures, and the like, including, for example, an LC circuit configuration, a primary coil configuration, wireless charger and receiver configurations, a procedure for calculating magnetic air gap, magnetic air gap classes, and so forth. However, the embodiments in their broader sense are not as limited. Rather, the embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving vehicle information from a wireless charging-capable vehicle via a wireless communication means;
   calculating an air gap between a primary coil of a wireless charging system that is operable to wirelessly charge the vehicle and a secondary coil of the vehicle based on the received vehicle information; and
   causing electric current to flow only through a portion of the primary coil having a size that is less than or equal to a size of the entire primary coil, wherein
   the size of the portion of the primary coil through which the electric current flows is determined based on the calculated air gap between the primary coil and the secondary coil,
   the portion of the primary coil through which the electric current flows is one of a plurality of predefined portions of a single coil, and
   the calculating of the air gap between the primary coil and the secondary coil comprises:
      determining a distance of the secondary coil from the ground based on the received vehicle information;
      determining a distance of the primary coil from the ground; and
      calculating the air gap between the primary coil and the secondary coil based on a difference between the distance of the secondary coil from the ground and the distance of the primary coil from the ground.

2. The method of claim 1, wherein the portion of the primary coil is one of a plurality of predefined portions of the primary coil.

3. The method of claim 2, wherein the plurality of predefined portions of the primary coil are defined by an LC circuit in which a plurality of switching elements control whether electric current flows through the plurality of predefined portions of the primary coil.

4. The method of claim 3, further comprising:
   selecting one or more of the plurality of switching elements based on the calculated air gap between the primary coil and the secondary coil; and
   activating the selected switching elements, such that electric current flows only through the portion of the primary coil.

5. The method of claim 2, further comprising:
   defining a portion of the plurality of predefined portions of the primary coil by establishing a size of the defined portion.

6. The method of claim 5, further comprising:
   evaluating the defined portion based on one or more evaluation criteria.

7. The method of claim 6, further comprising:
   adjusting the size of the defined portion based on the evaluation of the defined portion.

8. The method of claim 2, wherein a size of each predefined portion of the primary coil is different from that of the other predefined portions of the primary coil.

9. The method of claim 2, wherein the plurality of predefined portions of the primary coil are concentric portions of the primary coil.

10. The method of claim 2, further comprising:
causing electric current to flow through a selection of portions among the plurality of predefined portions of the primary coil during a process in which the vehicle is being aligned with the wireless charging system.

11. The method of claim 1, wherein a shape of the primary coil is square-like, rectangle-like, circle-like, or oval-like.

12. The method of claim 1, wherein a coil winding pattern of the primary coil is substantially evenly distributed throughout the primary coil.

13. The method of claim 1, wherein a coil winding pattern of the primary coil is substantially follows a logarithmic-like distribution pattern.

14. The method of claim 1, wherein the calculated air gap between the primary coil and the secondary coil corresponds to one of a plurality of predefined ranges of air gap between the primary coil and the secondary coil.

15. The method of claim 14, further comprising:
determining which of the plurality of predefined ranges of air gap between the primary coil and the secondary coil corresponds to the calculated air gap between the primary coil and the secondary coil.

16. The method of claim 14, wherein the plurality of predefined ranges of air gap between the primary coil and the secondary coil include at least a first range of air gap and a second range of air gap, which is greater than the first range of air gap.

17. The method of claim 1, wherein:
the portion of the primary coil is one of a plurality of predefined portions of the primary coil, and
the calculated air gap between the primary coil and the secondary coil corresponds to one of a plurality of predefined ranges of air gap between the primary coil and the secondary coil.

18. The method of claim 17, further comprising:
determining the portion of the primary coil, among the plurality of predefined portions of the primary coil, based on the predefined range of air gap between the primary coil and the secondary coil to which the calculated air gap corresponds.

19. The method of claim 17, wherein for each predefined range of air gap between the primary coil and the secondary coil, there is a corresponding predefined portion of the primary coil.

20. The method of claim 1, wherein the received vehicle information indicates one or more of: a distance of the secondary coil from the ground, a distance of an undercarriage portion of the vehicle from the ground, and details relating to installation of the secondary coil in the vehicle.

21. The method of claim 1, wherein the electric current flowing through the portion of the primary coil wirelessly charges the vehicle.

22. A wireless charging system comprising:
wireless communication means wirelessly receiving vehicle information from a wireless charging-capable vehicle;
a controller calculating an air gap between a primary coil of the wireless charging system that is operable to wirelessly charge the vehicle and a secondary coil of the vehicle based on the received vehicle information; and
an LC circuit causing electric current to flow only through a portion of the primary coil having a size that is less than or equal to a size of the entire primary coil, wherein
the size of the portion of the primary coil through which the electric current flows is determined based on the calculated air gap between the primary coil and the secondary coil,
the portion of the primary coil through which the electric current flows is one of a plurality of predefined portions of a single coil, and
the calculating of the air gap between the primary coil and the secondary coil comprises:
determining a distance of the secondary coil from the ground based on the received vehicle information;
determining a distance of the primary coil from the ground; and
calculating the air gap between the primary coil and the secondary coil based on a difference between the distance of the secondary coil from the ground and the distance of the primary coil from the ground.

* * * * *